United States Patent
Ullrich

(10) Patent No.: US 7,370,347 B2
(45) Date of Patent: May 6, 2008

(54) AUTHENTICATION SCHEME SYSTEM AND METHOD

(75) Inventor: Kai O. Ullrich, Heidelberg (DE)

(73) Assignee: SAP AG, Walldorf (DE)

( * ) Notice: Subject to any disclaimer, the term of this patent is extended or adjusted under 35 U.S.C. 154(b) by 549 days.

(21) Appl. No.: 10/609,130

(22) Filed: Jun. 27, 2003

(65) Prior Publication Data

US 2004/0268154 A1 Dec. 30, 2004

(51) Int. Cl.
*G06F 17/30* (2006.01)
*G06F 7/04* (2006.01)

(52) U.S. Cl. .......................... 726/4; 713/155; 713/182
(58) Field of Classification Search ................. 713/155
See application file for complete search history.

(56) References Cited

U.S. PATENT DOCUMENTS 7,039,714 B1 * 5/2006 Blakley III et al. ......... 709/229
2002/0053023 A1 * 5/2002 Patterson et al. ........... 713/156
2003/0084289 A1 * 5/2003 Watanabe ................... 713/168
2006/0053296 A1 * 3/2006 Busboom et al. ........... 713/182

* cited by examiner

*Primary Examiner*—Kambiz Zand
*Assistant Examiner*—Aubrey H Wyszynski
(74) *Attorney, Agent, or Firm*—Mintz, Levin, Cohn, Ferris, Glovsky & Popeo, P.C.

(57) ABSTRACT

An authentication method and system provides an improved authentication scheme. The authentication scheme can be flexibly applied for authenticating various classes of users for access to information having various levels of security or sensitivity. One method includes receiving a request from a user for a portal content component. In response, an authenticator determines whether the user has satisfied a previous authentication requirement for the portal that is equal to or greater than an authentication requirement for the portal content component. If so, the requested portal content component is rendered. Accordingly, the disclosed approach conserves valuable authentication resources.

4 Claims, 4 Drawing Sheets

AUTHENTICATION SCHEME SYSTEM AND METHOD

BACKGROUND

The following description relates to computing environment security methods and systems.

Security mechanisms are widely employed in computing environments to inhibit access by a user to computing resources until after the identity of the user has been authenticated. One type of authentication mechanism includes a single sign-on (SSO) security process. Typically, an SSO process requires a user to provide one or more pieces of validating data in a single sign-on interface in a display. Once authenticated, the user gains access to computing resources, usually for the entire course of a computing session.

Conventional SSO processes, however, lack the granularity of "pluggability," that is, implementation of such processes are generally designed for a global software environment and not for specific applications or content. Accordingly, many applications or content in a computing environment usually have the same authentication requirements despite different security requirements. For instance, one application may provide access to content that is more confidential than content accessible by another application.

Ordinarily, web applications have a certain flow during logon, e.g. first check for a SSO token, and if not present, display a logon screen for authentication against the user master source. This flow might be sufficient for ordinary users, but some special users may require access to special context where strong authentication with SSL and mutual authentication is required. Several examples could be a manager that accesses sensitive human resource (HR) data, or administrator that needs access to administrative components of a web portal. The fact that some content needs stronger protection does not only mean that the set of authorized persons is restricted; it also means that authentication must be more difficult to fake or eavesdrop.

Additionally, different users may have different security requirements. For example, a user may have access to applications and content through a role-based enterprise portal, also known as their "workplace." If each user requires unique access requirements, an enterprise, particularly the larger ones, would have to create an corresponding large number of different workplaces and associated authentication requirements, and identify and code the workplace requirements for each user. More than ever, enterprises need to identify and create authentication mechanisms for their computing systems that can be generic yet still meet the enterprise's varied security and access objectives.

SUMMARY

This document discloses a method and system for authenticating a user to provide content to a portal for the user. In one aspect a computer-implemented method of providing content in a portal includes receiving a request from a user for a portal content component, and determining whether the user has satisfied a previous authentication requirement for the portal that is equal to or greater than an authentication requirement for the portal content component.

In another aspect a computer-implemented method of providing content in a portal includes receiving a request from a user to access the portal. In response to the request, one of a plurality of authentication mechanisms for authenticating the user and enabling access to the portal is selected, where each authentication mechanism includes a different authentication requirement. The selected authentication mechanism can be selected manually by the user or automatically by the portal runtime environment. The selected authentication mechanism is then provided to the user.

Details of one or more implementations are set forth in the accompany drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to pluggable authentication schemes for multi-level access to applications and content from an enterprise portal. Accordingly, the described authentication scheme conserves authentication resources.

Figure 1:
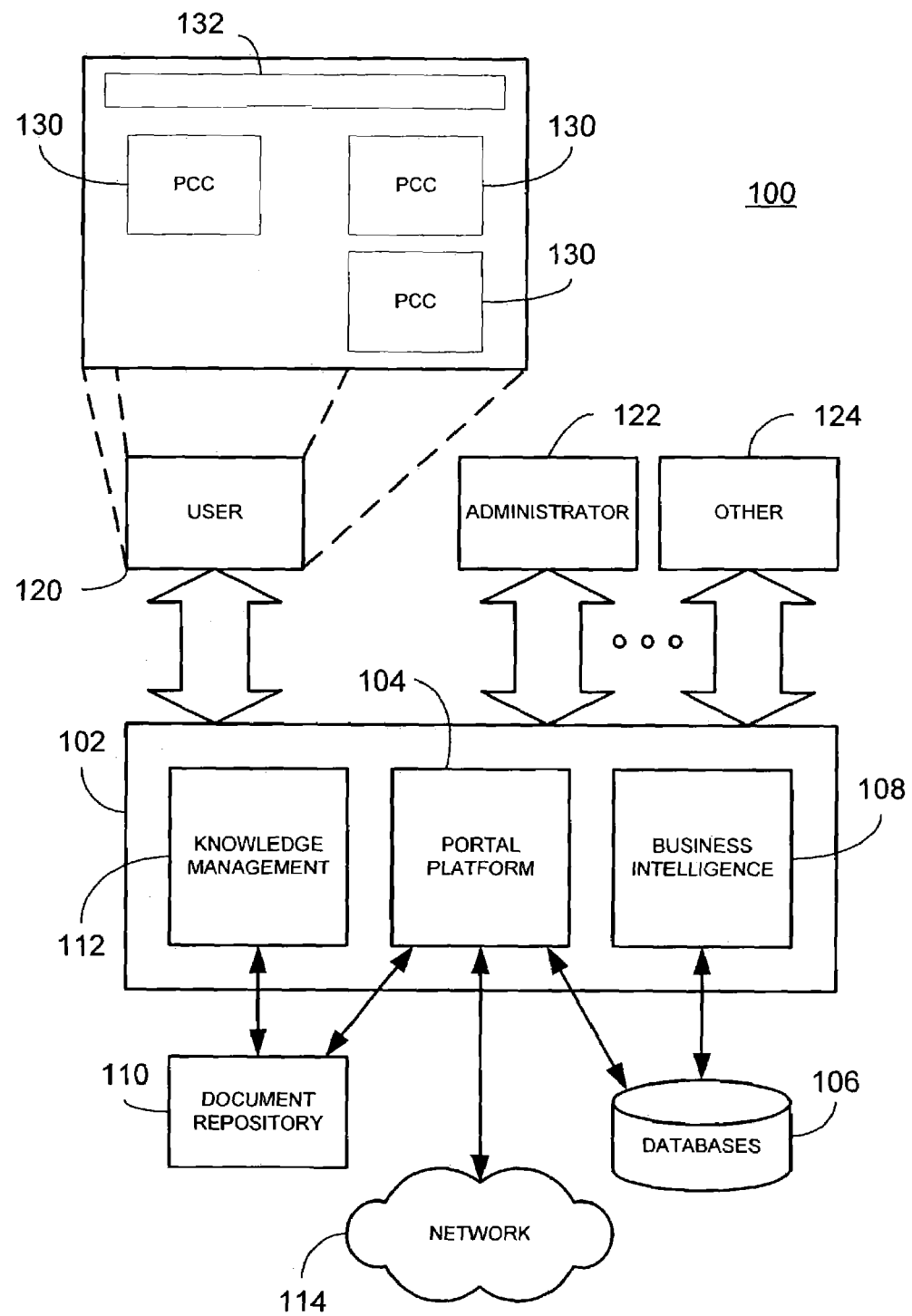
FIG. 1 is a simplified block diagram of a portal system including an enterprise portal employing one or more authentication schemes.

FIG. 1 is a block diagram of a portal system 100 in which an authorization scheme may be implemented according to this description. In the pictured example, the portal system 100 includes a portal 102 that is configured to present a variety of information from various disparate sources through a unified visual interface. The portal 102 operates as part of a centralized portal platform 104, which provides tools and processes for interacting with various data stores, and for integrating the disparate information so that it can be presented to a user in a customizable or consistent format.

The portal platform 104 obtains data from various applications and content sources. For example, databases 106 may store various types of information, such as structured business data stored in one or more flat file or relational databases, or other types of data. The portal platform 104 may access databases 106 directly, or may employ business intelligence module 108 to access and present the information. The portal platform 104, in concert with business intelligence module 108, may access and aggregate the appropriate data for presentation as an application or content to a user, as well as information needed to operate and configure the portal platform 104.

Data also may be accessed from a document repository 110, either directly by portal platform 104 or indirectly using knowledge management module 112. The portal platform 104, with the knowledge management module 112, can be used to search for documents that might be relevant for an ongoing project. Both structured and unstructured data and applications also may be accessed from other locations using a network 114, such as the Internet, an intranet, an extranet, etc.

The enterprise portal system 100 can present data to various users in custom visual formats and levels of security, referenced here as portal displays. Generally, the displays may be configured according to the role played by the person who is viewing the portal, or by a class of a user. For example, an employee portal display 120 may correspond to an employee of a company or other enterprise and may provide the employee with access to information the employee needs to conduct his or her job, such as an internal telephone directory, product ordering forms, e-mail, and scheduling. Likewise, an administrator portal display 122 may provide an administrator with access to more security-sensitive information with which to monitor, configure and control an enterprise's suite of business applications. Many other roles and levels of security are possible.

A user class portal display 120 is shown in FIG. 1 in greater detail to illustrate the presentation and function of an enterprise portal system 100. An enterprise portal, such as is shown in FIG. 1, allows the integration of information and functions from a wide range of sources, and can present information from a Web site, integrate functions from business software, or provide search functions. As an example, one type of portal component through which such information or function can be presented is known as an integrated view, or "iView" 130. An iView 130 is a portal content component that retrieves data from one or more applications or storage media such as the databases 106 or document repository 110 or network 114, and displays it as content in the enterprise portal. Each iView 130 can be used to connect to virtually any content, application or service, such as Microsoft Outlook, mySAP.com, Oracle 11i, WebEx and Yahoo!, without the need for bookmarks, time-consuming launches, or long searches. One or more iViews 130 arranged in a display represents a personalized portal that is an always-on, always-active link to all the applications and content needed by the user. The portal display 120 can also include a navigation mechanism 132.

The content displayed by a portal 102 can be role-based, i.e. it depends on a user's position, interests, and security level within the enterprise. A portal 102 may have a number of generic roles associated with it that define the worksets that will be presented to a particular class of users, and the permission that those users will have with respect to the workset. As an example, one portal may be assigned for an executive class of users, i.e. for a role of CEO of an organization. Any users assigned that role may be provided with security-sensitive, high-level overview information on the organization when they are authorized to access the portal. They may also be given only permissions to review information, but not to change it.

Access to content via an iView 130 is governed by an authentication scheme, or "authscheme." An authscheme defines the steps that must be accomplished as part of an authentication mechanism, and defines the pieces of information that are required to compute and authenticate the identity of a user. An authscheme can also define the technical mechanism by which the information is processed. For example, an authscheme can define the type of user ID and password that are required for an SSO process, as well as the mechanism used to check the user ID and password, such as the Lightweight Directory Access Protocol (LDAP).

An authscheme also defines the user interaction that must occur in order to gather required information by the authentication mechanism. For example, the authscheme can include one or more iViews 130 that display logon forms, error/success messages, etc. Further, an authscheme can provide the credential lifetime of the logon. For instance, when admission to computing resources is granted at time X after successful authentication by an authentication scheme, and the credential lifetime is defined as N, then a re-authentication process will need to be launched when the user attempts to access an iView in the portal after a time X+N.

Authschemes can define other aspects as well, such as a logon policy, and a weight that allows prioritization of several authschemes. One benefit of having weighted authschemes is, if a user has already successfully authenticated with authscheme X which is of a higher weight than authscheme Y, the user will not need to reauthenticate for all resources that require a weight equal to or less than a weight of authscheme Y. Authschemes are also important for filtering based on role content. If a filter is defined for a folder in a portal content directory (which stores each portal content component), and the filter defines that an authscheme with a priority X is needed, a user that logs on to a folder using an authscheme having a priority that is less than X will find that the folder as a whole is filtered and its contents will not be displayed at all in the page.

Figure 2:
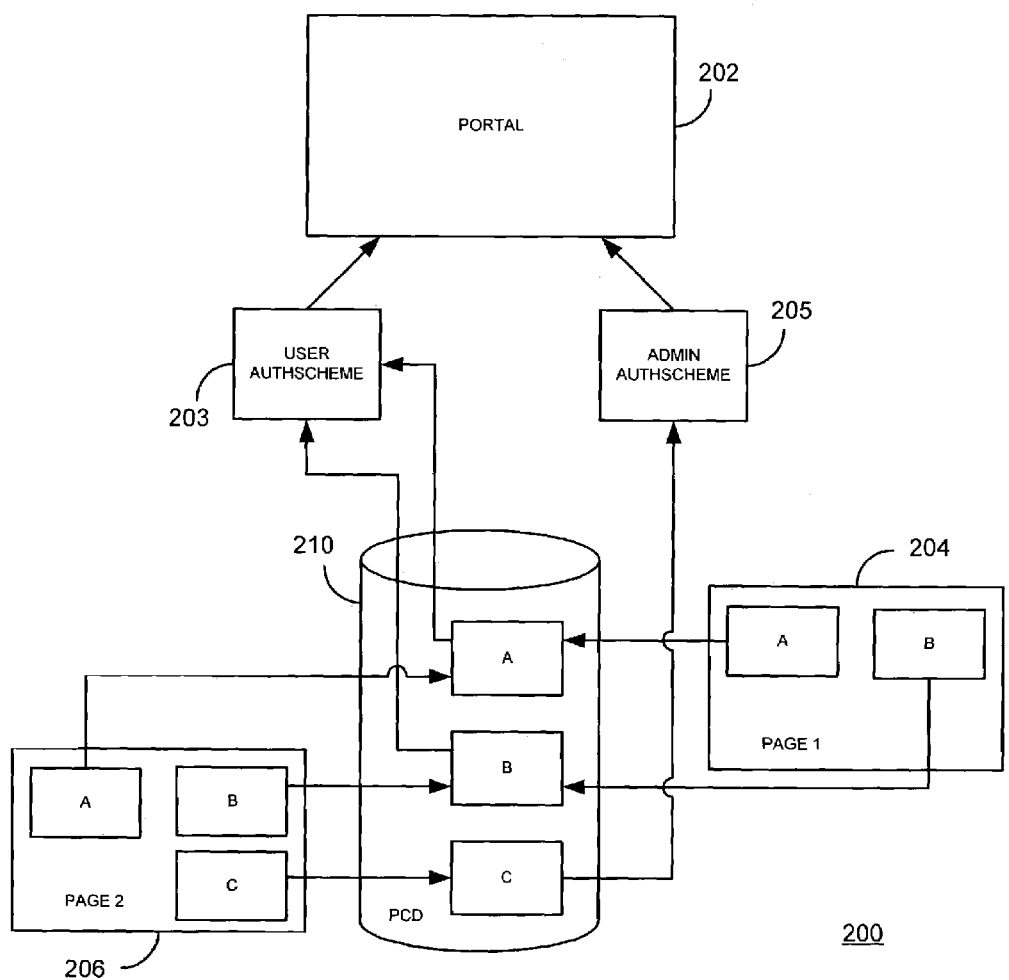
FIG. 2 is a functional diagram of a portal runtime environment including one or more authentication schemes.

FIG. 2 illustrates an example of a portal runtime (PRT) 200 environment for the portal system, also known as a PRT engine. The PRT 200 is preferably a software component executing within a server, but may also be hardware or a combination of hardware and software. The PRT 200 represents a software runtime that accesses one or more computing resources, executes a graphical user interface (GUI) for the computing resources, and assembles the GUI in the portal, loads one or more portal content components, arranges them together on a page, and executes them to include releasing resources after termination.

A display 202 presents an integrated GUI in the form of a combination of one or more portal pages 204 or 206. An unlimited number of combinations and arrangements of the portal pages are possible. For instance, in the example, portal page 204 includes portal content components A and B, while portal page 206 includes portal content components A, B and C. In the example, portal content components A and B have a relatively low authentication requirement, while portal content component C has an authentication requirement that is higher than the authentication requirement for portal content components A and B, and thus may require a more rigorous authscheme.

A portal content directory (PCD) 210 stores definition and meta attributes of all portal content components A, B and C. When a page 204 or 206 is to be displayed, the PRT 200 retrieves the information from the PCD 210 about which portal content components A, B and C are to be included on the page, and information about their associated authscheme. Then, all information about the portal content components to be displayed is retrieved from the PCD 210, including the authscheme. Before the accessed portal content components are executed, logic in the PRT environment known as an authenticator checks whether any authentication requirement for an authscheme associated with a previously-accessed portal content components has already been satisfied, and if so, whether the already-satisfied authentication requirement has a higher priority or weight than any of the authentication requirements associated with the portal content components being accessed for the page.

In one example, if page 204 is to be accessed and displayed, the authenticator causes the PRT 200 retrieves the information about portal content components A and B, each of which can be accessed through authscheme 203. Authscheme 203 may be associated with a regular user. Since both components A and B share the same authscheme 203, if authscheme 203 is satisfied once, it need not be satisfied for the other component.

In another example, however, if page 206 is to be displayed, the authenticator causes the PRT retrieves information for components A, B and C, as well as associated authschemes 203 and 205. If a user satisfies authscheme 203 first, and component C is to be displayed, the authenticator first checks whether authscheme 203 has a higher priority than authscheme 205. If not, authscheme 205 is executed and component C is not accessible until an authentication requirement associated with authscheme 205 is satisfied. If authscheme 203 has an equal or greater weight than authscheme 205, then component C may be displayed without further authentication of the user.

An authscheme will be provided to the user in at least the following cases. First, whenever a user directly starts a portal content component over a URL (e.g. if someone sends a link by email), the PRT 200 computes the corresponding authscheme and displays an authentication mechanism of the authscheme as a view component prior to rendering the portal content component itself. A second case exists when a user first accesses the PRT 200, but no authentication has taken place. If more than one authscheme is installed, the user should be able to select an authscheme with which to perform the authentication. Users in one class could choose a default authscheme, however users in a higher-security class would have to alter the authscheme before entering logon data in order for the higher-priority content components to being displayed. The selection process for which authentication scheme to execute could be represented in the form of a drop-down box associated with the portal display.

Figure 3:
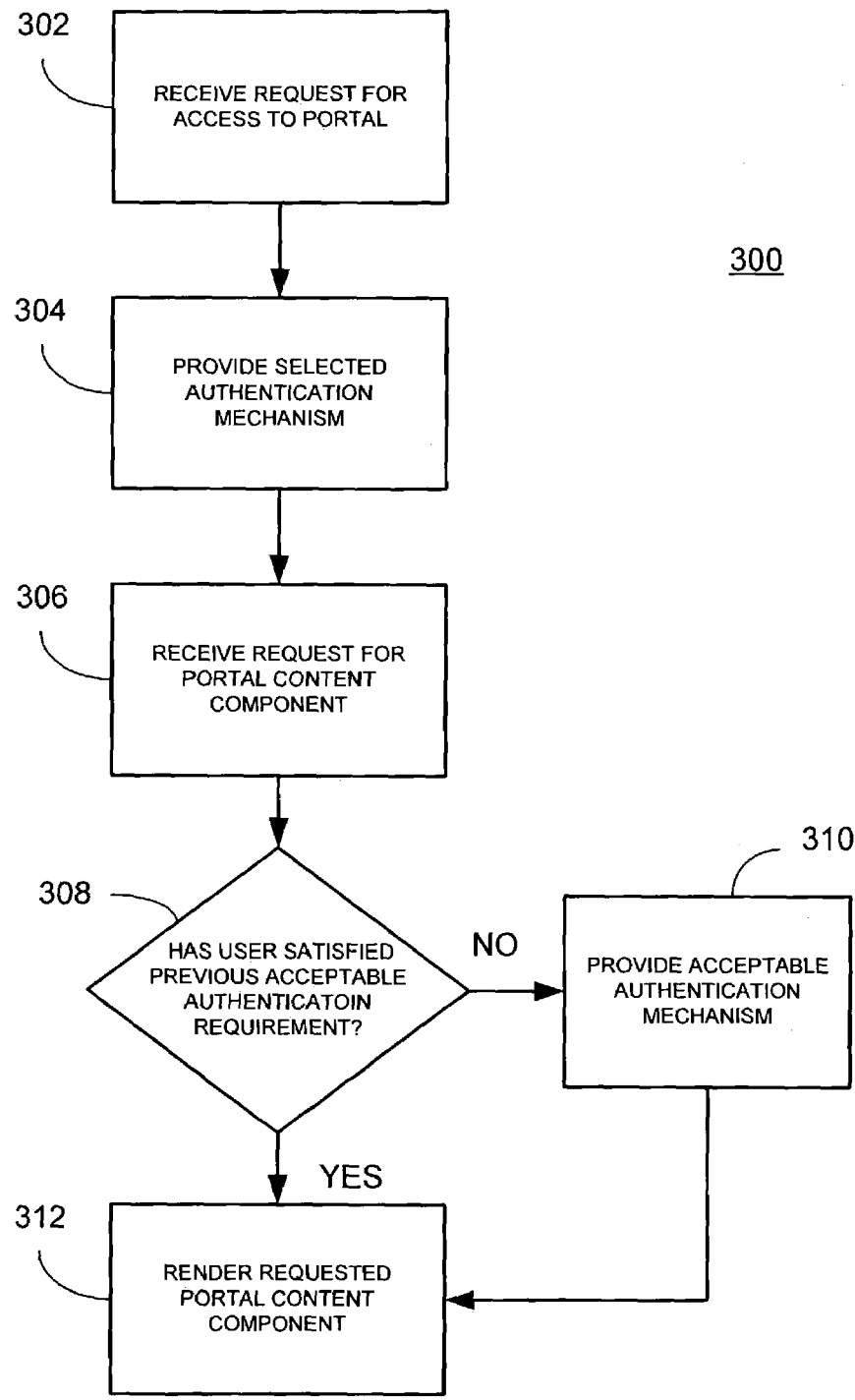
FIG. 3 is a general flowchart of a computer-implemented method of accessing content in a portal.

FIG. 3 illustrates a process 300 for accessing content in a portal in accordance with the cases described above. The process 300 is preferably executed by the PRT 200, but may be executed by any logic associated with a portal. At block 302, a request is received from a user for access to the portal or to a computing resource accessible from the portal. The computing resource can be an application or content. If this is a first access attempt by the user, i.e. no authentication has yet taken place, at block 304 a selected one of a plurality of authentication mechanisms is provided to the user via the portal. The authentication mechanism is associated with an authscheme which is in turn associated with the request received from the user at block 302.

Once the user is authenticated, or if the user has been previously authenticated, a request for a specific portal content component can be received at block 306. At block 308, a determination is made whether the user has satisfied a previous authentication requirement for the portal, i.e. as a first access logon or to access a different portal content component, where the previous authentication requirement is equal to or greater than an authentication requirement for the requested portal content component. In other words, each authentication requirement may be defined by a weight or a priority, which allows for the determination at block 308 to be made.

If the previous authentication-requirement is less than the authentication requirement for the portal content component, at block 310 the user is provided with an authentication mechanism according to the authentication requirement for the requested portal content component. If the previous authentication requirement is equal to or greater than the authentication requirement for the portal content component, or if the authentication mechanism of block 310 is satisfied, at block 312 the requested portal content component will be displayed.

The following is an example authentication interface and a discussion of several calls. The code below is Java, however those with relevant skill in the art would recognize that such interface is not limited to Java or any particular programming language.

```
public interface IAuthenticationService
{
    public static final String KEY =
"com.sap.portal.runtime.system.authentication.authentication";
    /**
    * Verifying a certain authentication scheme (level of
access for iView)
    */
    public boolean isAuthSchemeSufficient (Principal caller,
IPortalComponentContext iViewContext);
    /**
    * Get the logon iview corresponding to the iView
    */
    public IPortalComponentContext
getLogonIView (IPortalComponentContext iViewContext,
IPortalComponentRequest request);
    /**
    * Return the logged on user
    * @deprecated
    */
    public IUserContext getLoggedInUser (HttpServletRequest
request, HttpServletResponse response);
    /**
    * Logs on the user for a given authscheme.
    *
    */
    public IUserContext login
        (HttpServletRequest request, HttpServletResponse
response, String scheme)
}
```

IAuthenticationService.getLoggedInUser (HttpServletRequest req, HttpServletResponse resp): determines whether a user has an active session, i.e. finds out whether a user has previously authenticated using some authscheme. The satisfied authscheme may be stored as an attribute in the returned user object (if an SSO session already exists) and can be queried during further computations.

IAuthenticationService.login (HttpServletRequest req, HttpServletResponse resp, String authscheme): performs a logon for a given authscheme. This call may be made after the PRT determines that a certain authscheme is necessary but not yet satisfied by the user. Then, a logon iView may be displayed, and the processing of the user input may be performed in this call.

IAuthenticationService.isAuthSchemeSufficient (IUserContext user, IPortalComponentContext requestedIView): compares if the user's already-satisfied authscheme is sufficient for the requested IView. In pseudo-code, this function may be implemented as follows:

```
IAuthScheme alreadySatisfiedAuthscheme = user.getAttribute
    (AUTHSCHEME);
        IAuthScheme neededAuthscheme   =
requestedIView.lookupAuthschemeInIViewConfiguration ( );
        int weight_satisfied =
        alreadySatisfiedAuthscheme.getWeight( );
        int weight_needed = neededAuthscheme.getWeight( );
        if (weight_satisfied>=weight_needed)
            return true;
        else
            return false;
```

The following is another exemplary interface for an authscheme:

```
public interface IAuthScheme
{
    /** Gets the name of the authscheme.
     * @return name of the authentication scheme
     *
     */
    public String          getName ( );
    /**
     * Gets the weight of an authscheme. Allowed are all
numerical values.
     * It is recommended that the default authentication
scheme has priority 0.
     * @return priority of the authentication scheme.
     */
    public int             getWeight ( );
    /**
     * Gets the authentication modules in the order of their
priority.
     * @return array of authentication module entries.
     */
    public AppConfigurationEntry [ ] getModules ( );
    /**
     * Gets the logon frontend information (i.e. basically
     * information about the user interface to be rendered
     * by the runtime for a particular authscheme logon
     * @return a reference to a ILogonFrontend object
     */
    public ILogonFrontend getLogonFrontend ( );
}
```

IAuthScheme.getLogonFrontend( ): returns the iView that represents the logon user interface for a given IView. Will be called when the PRT finds out that an authscheme needs to be satisfied and it wants to present the user the logon user interface that corresponds to this authscheme.

For the initial login, there is one portal content component that may be rendered when the page is still anonymous. It includes two parts: the first may be a drop-down list box containing the names of all available authschemes. The selected entry in the drop down list box should be the default authentication scheme. The second part may be a child node, where the logon page that corresponds to the authscheme selected from the list box is displayed. Accordingly, ordinary users can enter the logon data in a manner to which they are accustomed. Administrators who log on can change the authscheme and logon with one that allows them to see all portal content components immediately, including those requiring strong authentication schemes.

Figure 4:
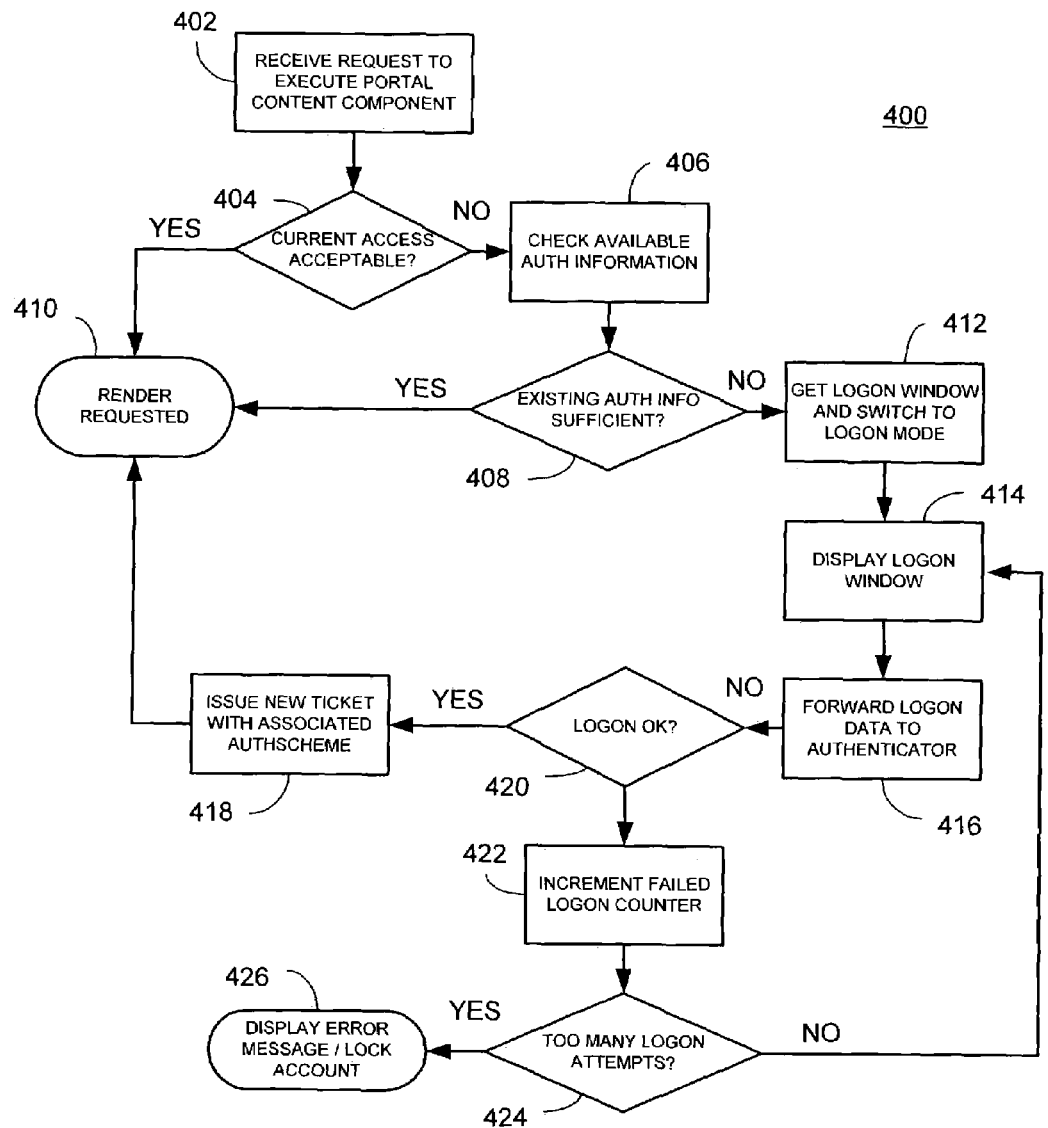
FIG. 4 is a detailed flowchart of a method of authentication scheme for a portal system.

FIG. 4 is a flowchart of an authentication process for gaining access to content via a portal, in accordance with the above description. At block 402, the PRT receives a request to execute a portal content component or similar content window in a GUI. At block 404, the PRT checks the authentication requirements for the requested portal content component. As part of this step, a determination may be made whether anonymous access is acceptable. If anonymous access is not acceptable, at block 406 the authenticator checks for available user information, including, but not limited to, existing user authentication information. If anonymous access is acceptable, at block 410 the requested portal content component is rendered in the portal.

At block 408, the authenticator determines whether an existing authentication mechanism, based at least in part on the user information from block 406, is sufficient for access to the requested portal content component. If such existing authentication is sufficient, at block 410 the requested portal content component is rendered. If the existing or previous authentication is not sufficient, at block 412 information for a logon window or page is accessed corresponding to an authentication requirement of the requested portal content component, and the PRT switches to a logon mode. At block 414 the logon window is displayed and user input is solicited. At block 416, logon data provided to the logon window by the user is forwarded to the authenticator.

At block 420, a determination is made whether the logon process was acceptable. If so, at block 418 a new ticket is issued with its associated authscheme, and the requested portal content component is rendered at block 410. If the logon process is still not acceptable, at block 422 the failed logon counter is incremented. The counter is monitored for failed logons to exceed a predetermined threshold, at block 424. If too many logons fail, at block 426 an error message may be displayed, and the account is locked until unlocked by an administrator or other means.

The processes of FIGS. 3 and 4 may be implemented in hardware, software, or a combination of the two. The processes described herein may be implemented in computer programs executing on programmable computers or other machines that each include a processor, a storage medium readable by the processor (including volatile and non-volatile memory and/or storage components), at least one input device, and one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium/article (e.g., CD-ROM, hard disk, or magnetic diskette) that is readable by a general or special purpose programmable computer for configuring and operating the computer when the storage medium or device is read by the computer to perform the process. The process may also be implemented as a machine-readable storage medium, configured with a computer program, where, upon execution, instructions in the computer program cause a machine to operate in accordance with the process.

Although only a few embodiments have been described in detail above, other modifications are possible. Portions of this disclosure discuss operation through a portal, but any of a number of access systems and methods may be used for authenticating a user and rendering requested content. The logic flow of FIGS. 3 and 4 does not require the particular order shown, or sequential order, to achieve desirable results. Likewise, the components shown in FIGS. 1 and 2 can be combined or arranged in various different ways. Other embodiments may be within the scope of the following claims.

The invention claimed is:

1. A computer-implemented method of providing content in a portal, the method comprising:

receiving a request from a user for a portal content component;

determining whether the user has satisfied a previous authentication requirement for the portal having a weight that is equal to or greater than a weight for an authentication requirement for the requested portal content component, wherein the requested portal content component is one of a plurality of portal content components and at least two of the portal content components have different authentication requirements with different weights; and providing an authentication mechanism according to the authentication requirement for the requested portal content component if the weight of the previous authentication requirement is less than weight of the authentication requirement for the requested portal content component; or initiating a display of the requested portal content component if the weight of the previous authentication requirement is equal to or greater than the weight of the authentication requirement for the requested portal content component.

2. A system for providing content in a portal, the system comprising:
- a portal content directory storing a plurality of portal content components, each portal content component having an authentication requirement for access thereto, wherein at least two of the portal content components have different authentication requirements;
- a portal runtime engine for receiving portal content component requests and for displaying one or more requested portal content components; and
- an authenticator configured to determine whether the user has satisfied a previous authentication requirement for the portal that has a weight that is equal to or greater than a weight for an authentication requirement for a requested portal content component.

3. An article comprising a tangible machine-readable medium embodying instructions that when performed by one or more machines result in operations comprising:
- receiving a request from a user for a portal content component;
- determining whether the user has satisfied a previous authentication requirement for the portal having a weight that is equal to or greater than a weight for an authentication requirement for the requested portal content component, wherein the requested portal content component is one of a plurality of portal content components and at least two of the portal content components have different authentication requirements with different weights; and if the weight of the previous authentication requirement is less than weight of the authentication requirement for the requested portal content component, providing an authentication mechanism according to the authentication requirement for the requested portal content component; or if the weight of the previous authentication requirement is equal to or greater than the weight of the authentication requirement for the requested portal content component, initiating a display of the requested portal content component.

4. An apparatus comprising:
- means receiving a request from a user for a portal content component;
- means for determining whether the user has satisfied a previous authentication requirement for the portal having a weight that is equal to or greater than a weight for an authentication requirement for the requested portal content component, wherein the requested portal content component is one of a plurality of portal content components and at least two of the portal content components have different authentication requirements with different weights;
- means for providing an authentication mechanism according to the authentication requirement for the requested portal content component if the weight of the previous authentication requirement is less than weight of the authentication requirement for the requested portal content component; and
- means for initiating a display of the requested portal content component if the weight of the previous authentication requirement is equal to or greater than the weight of the authentication requirement for the requested portal content component.

* * * * *